United States Patent [19]

Tabata et al.

[11] Patent Number: 4,663,224

[45] Date of Patent: May 5, 1987

[54] VIBRATION-SUPPRESSING SOUND-SHIELDING BOARD

[75] Inventors: Keiichirou Tabata, Yokohama; Nobufumi Matsudaira, Zushi; Shozo Sugiki, Yokohama, all of Japan

[73] Assignee: Bridgestone Corporation, Tokyo, Japan

[21] Appl. No.: 682,122

[22] Filed: Dec. 17, 1984

[30] Foreign Application Priority Data

Dec. 16, 1983 [JP] Japan .......................... 58-193003[U]

[51] Int. Cl.$^4$ ............................................. B32B 7/00
[52] U.S. Cl. ................................... 428/246; 181/208; 181/290; 181/294; 428/316.6; 428/317.7; 428/354; 428/355; 428/356; 428/492; 428/496; 428/511
[58] Field of Search ............... 428/246, 284, 354, 356, 428/492, 703, 500, 316.6, 317.7, 492, 448; 181/290, 294, 208; 418/355, 496, 511

[56] References Cited

U.S. PATENT DOCUMENTS

| | | |
|---|---|---|
| 2,774,698 | 12/1956 | Jenk et al. ............................ 428/496 |
| 2,875,101 | 2/1959 | Ehrlich ................................ 428/496 |
| 3,424,270 | 1/1969 | Hartman et al. .................... 181/290 |
| 3,652,360 | 3/1972 | Hartman et al. .................... 181/290 |
| 4,096,307 | 6/1978 | Lagowski ............................ 181/294 |
| 4,233,357 | 11/1980 | Taylor et al. ....................... 428/284 |
| 4,312,908 | 1/1982 | Jasperson ............................ 428/511 |
| 4,468,431 | 8/1984 | Okey ................................ 428/317.7 |

Primary Examiner—James J. Bell
Attorney, Agent, or Firm—Armstrong, Nikaido, Marmelstein & Kubovcik

[57] ABSTRACT

A composite board having an excellent vibration-suppressing sound-shielding performance can be obtained by joining a plurality of board materials with each other by the intermediary of a tacky adhesive. This tacky adhesive contains, as its principal components, one or more kinds of polymers selected from the group consisting of natural rubber, synthetic rubbers, various resins (acrylic resin, silicone resin, etc.). A sheet-like base material such as a paper sheet can be used in association with the tacky adhesive layer in the composite board, and such type of composite boards have an excellent vibration-suppressing sound-shielding performance as compared to the composite boards in which the tacky adhesive layer is not associated with a sheet-like material.

7 Claims, 9 Drawing Figures

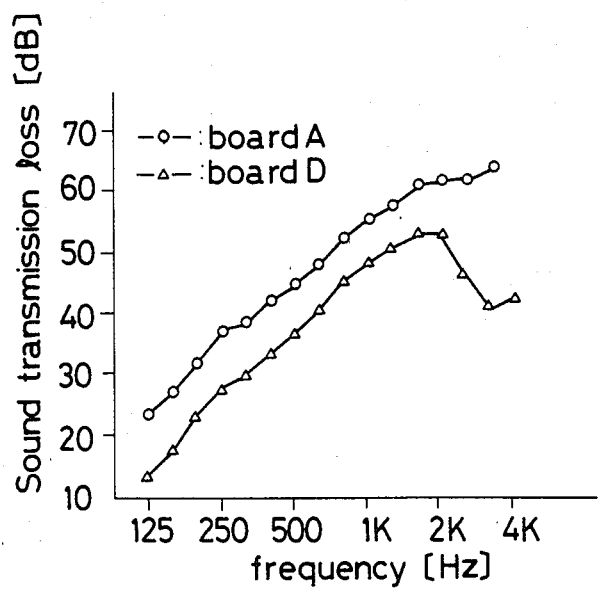
FIG. 7
FIG. 8
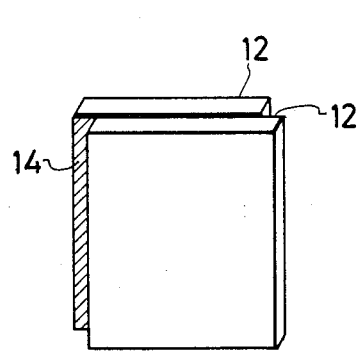
FIG. 9
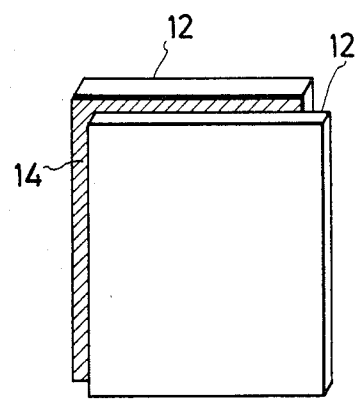

VIBRATION-SUPPRESSING SOUND-SHIELDING BOARD

BACKGROUND OF THE INVENTION

The present invention relates to a vibration-suppressing sound-shielding board that is available as a building material.

In order to shield a sound generated from the interior of a building so as not to leak out to the exterior, or in order to shield a noise in the exterior of a building so as not to invade into the building, heretofore, a gypsum plaster board, an asbestos cement board, a calcium silicate board, various kinds of plywoods, a metal plate, etc. have been used as a sound-shielding wall material. However, these known board materials are poor in a vibration damping performance, and their loss factors ($\eta$) at a frequency in the proximity of 500 Hz, for example, are 0.01 or less. In the proximity of the characteristic frequency of such board material whose vibration-damping performance is poor, a sound-shielding performance is extremely lowered due to resonance phenomena and coincidence phenomena (the phenomena that a sound propagating velocity in the board material coincides with the sound velocity in the air). Accordingly, a problem was present that even if two rooms in a building should be partitioned by means of a sound-shielding wall, a sound of a piano played in one room would be heard in the other room through the sound-shielding wall.

Here, it is to be noted that the loss factor ($\eta$) is employed as a measure for hardness of resonance of a vibration system, and a reciprocal of that factor is a Q-value. This Q-value is used as a quantity for indicating a sharpness of resonance when a vibration system resonates, and if a frequency width between two points having an amplitude equal to $1\sqrt{2}$ times the maximum amplitude value (i.e. an energy equal to $\frac{1}{2}$ times the maximum energy) on a resonance curve depicted in the case of varying a frequency in the proximity of a resonance frequency is represented by $\Delta f$ (called half-value width), then the Q-value is derived from the equation $Q = f_o/\Delta f$, where $f_o$ is a characteristic frequency of the vibration system. Accordingly, the larger the loss factor ($\eta$) is, the harder is the vibration system to resonate in the case where an external vibrating force is applied to the vibration system.

In order to resolve the above-mentioned problem, it was proposed in the prior art to use a composite board consisting of a plurality of board materials joined with an adhesive or a composite board consisting of a plurality of board materials with a viscoelastic substance (for instance, elastomer) intervening therebetween, as a sound-shielding board (See Japanese Utility Model Publication No. 54-4491). However, the loss factor ($\eta$) of the above-described former composite board which simply utilizes an adhesive is not so different from that of a single board, and hence improvements in a sound-shielding performance are very little. On the other hand, the above-referred latter composite board making use of a viscoelastic substance has an excellent vibration-suppressing sound-shielding performance, but nevertheless the viscoelastic substance as disclosed in Japanese Utility Model Publication No. 54-4491 is very complexed in a manufacturing process and expensive in a manufacturing cost, and moreover, since an adhesive must be used for joining the board materials and the viscoelastic substance, a lot of labor is necessitated for manufacturing the composite board. The present invention has been worked out under the above-mentioned background of the art.

SUMMARY OF THE INVENTION

It is therefore one object of the present invention to provide a vibration-suppressing sound-shielding board which has an excellent vibration-suppressing sound-shielding performance, which can be manufactured through a simple and easy work, and hence which is less expensive in a manufacturing cost.

According to one feature of the present invention, there is provided a composite board having a vibration-suppressing sound-shielding performance which consists of boards for use as building materials joined with each other by the intermediary of a tacky adhesive layer.

According to another feature of the present invention, there is provided a composite board having a vibration-suppressing sound-shielding performance which consists of boards for use as building materials joined with each other by the intermediary of at least one tacky adhesive layer associated with a sheet-like base material.

The above-mentioned and other features and objects of the present invention will become more apparent from perusal of the following detailed description of the invention with reference to the accompanying drawings.

BRIEF DESCRIPTION OF THE DRAWINGS

FIG. 7 is a diagram showing a transmission loss (dB) of a sound wave measured with respect to the respective structures shown in FIGS. 5 and 6, and FIGS. 8 and 9 are perspective views showing two different modes of joining two board materials by the intermediary of a tacky adhesive layer, which are both preferable for forming a sound-shielding wall by connecting a plurality of vibration-suppressing sound-shielding boards according to the present invention.

DETAILED DESCRIPTION OF THE INVENTION

Figure 1:
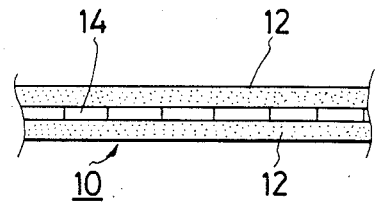
FIG. 1 is a cross-sectional view showing a structure of a vibration-suppressing sound-shielding board according to one preferred embodiment of the present invention.

Before entering detailed description of the present invention, it will be necessary to clearly define the distinction between the materials designated respectively by similar technical terms "adhesive" and "tacky adhesive" throughout this specification and the appended claims. The "adhesive" can rigidly join two bodies in its solid state although it is in a liquid or fluid state before use, and if it is tried to separate the two joined bodies from each other, the both or either one of the bodies must be broken. Whereas, the "tacky adhesive" which is also called "pressure sensitive adhesive" would not lose its tackiness and adhesiveness over a long period of time, and hence even after two bodies have been joined by the intermediary thereof, it is still in a semi-fluid state, so that rigid joining between two bodies by the intermediary of the tacky adhesive cannot be expected and it is possible to separate the two joined bodies from each other. At that time, the phenomenon that the tacky adhesive extends in a stringy manner, would arise. However, in the case of separating two bodies joined by the intermediary of a tacky adhesive, they should not be easily pealed off with a small force, and so, the tacky adhesive is required to have such tackiness that only when a force having an appropriats magnitude has been applied to the joined bodies the tacky adhesive would present a fluidity and thus the two bodies can be separated from each other.

Principal components of a tacky adhesive are polymers having a fluidity at an ordinary temperature, and one or more kinds of either emulsion type or solvent type of polymers consisting of natural rubber series, synthetic rubber series, or plastics series (acrylic resin, silicone resin, etc.) are used. In order to enhance a tackiness, a tackifier such as petroleum resin, sap, etc., a softener, and a plasticizer are added to these principal components, and thereby the tacky adhesive can be manufactured.

A tackiness of a tacky adhesive is represented by a pealing tack force and a tensile shearing tack force. With regard to the numerical values of these tack forces, a tacky adhesive having a pealing tack force of about 200~5000 gf/20 mm and a tensile tack force of about 1~15 Kgf/cm$^2$, is empolyed.

According to the present invention, a composite board having a laminated structure is formed by joining a same kind or different kinds of boards to be used as building materials such as gypsum plaster boards, asbestos cement boards, calcium silicate boards, various kind of plywoods, metal plates and the like by making use of the above-described tacky adhesive.

According to a modified mode of embodiment of the present invention, a foil-like or sheet-like base material formed of synthetic rubber, natural rubber, plastics, metals or their composite materials (they could be a foamed body), or a sheet-like base material such as a paper sheet or a cloth (a fabric, an unwoven fabric) is applied or impregnated with the above-described tacky adhesive, then the thus obtained tacky adhesive layer associated with a sheet-like base material is sandwiched between a pair of boards, and by joining the boards under an applied pressure, a composite board can be obtained.

It is to be noted that a composite board can be also formed by employing one or more sheet-like base materials as core materials and joining a pair of boards while applying a tacky adhesive onto the core materials, rather than the sheet-like base material is preliminarily applied or impregnated with the tacky adhesive.

In addition, the composite board according to the present invention need not be limited to that consisting of two boards joined by the intermediary of a tacky adhesive layer, but it could be formed of three or more boards joined with each other in a similar manner.

If a mechanical or sonic vibrating force is exerted upon the thus obtained composite board, then a deformation of the overall composite board would reveal itself mostly as a shearing deformation in the tacky adhesive layer, the vibration energy is absorbed by a viscous deformation resistance of the tacky adhesive layer, and therefore, an excellent vibration-suppressing sound-shielding performance can be presented without generating resonance of the composite board.

DESCRIPTION OF PREFERRED EMBODIMENTS

Now the present invention will be described in greater detail in connection to its preferred embodiments illustrated in FIGS. 1 through 9.

Figure 2:
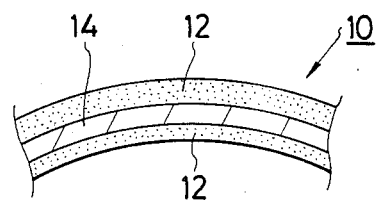
FIG. 2 is a cross-sectional view showing a state of the vibration-suppressing sound-shielding board illustrated in FIG. 1 which is bent due to vibration, FIG. 3 includes cross-sectional views of various boards prepared for the purpose of confirming the advantages of the vibration-suppressing sound-shielding board according to the present invention, and a perspective view of a test piece to be cut out of these boards.

A vibration-suppressing sound-shielding board 10 shown in FIG. 1 has a sandwich-like structure in which gypsum plaster boards 12 are joined with each other by the intermediary of a tacky adhesive layer 14. If a vibrating force is exerted upon the vibration-suppressing sound-shielding board 10, the vibration-suppressing sound-shielding board 10 would be deformed into a bent shape as shown in FIG. 2 in an exaggerated manner. At this moment, since the tacky adhesive layer 14 is subjected to shearing deformation as shown by oblique hatching, frictional heat due to "shearing deformation" is generated between the gypsum plaster boards 12 and the tacky adhesive layer 14 and within the tacky adhesive layer 14 itself. If the vibration energy applied to the vibration-suppressing sound-shielding board 10 can be converted into thermal energy in the above-described manner, then a damping effect by the vibration-suppressing sound-shielding board 10 can be revealed.

Figure 3:
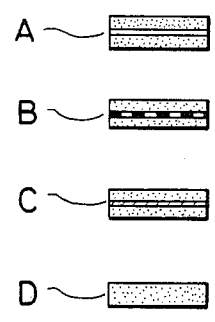
Figure 3:
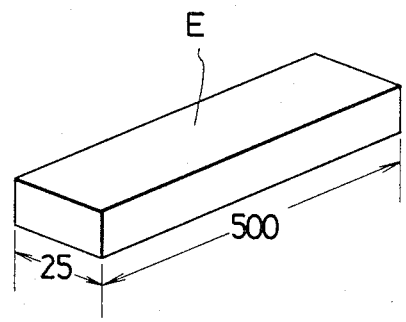
Figure 4:
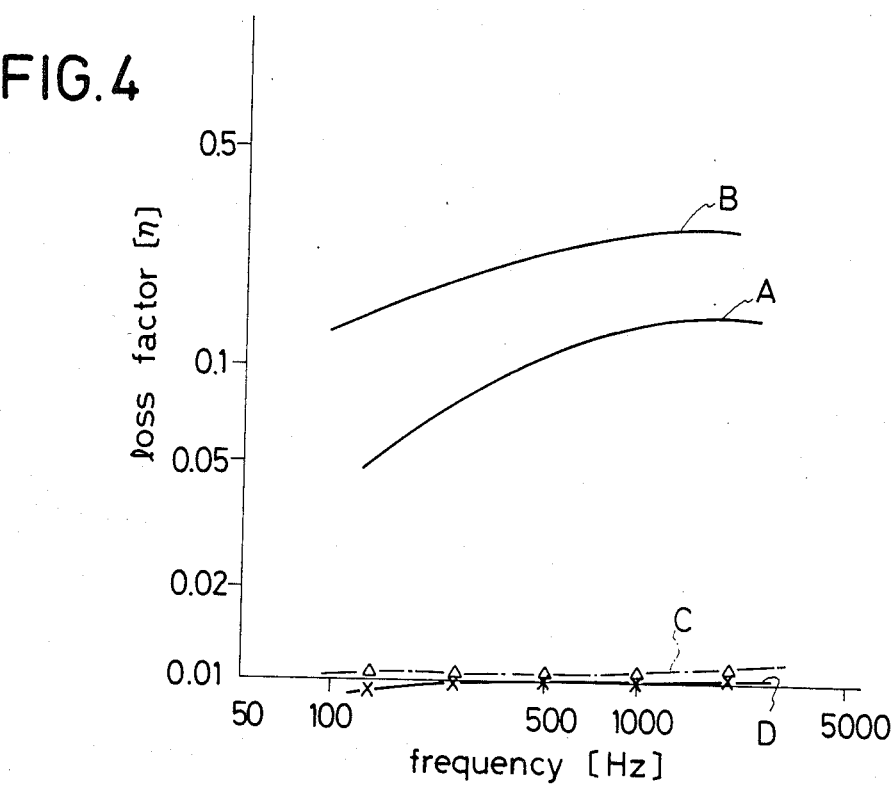
FIG. 4 is a diagram showing results of measurement for loss factors ($\eta$) of the test pieces cut out of the above-described respective boards.

In order to confirm the effect of the vibration-suppressing sound-shielding board 10, the inventors of this invention have cut out a test piece E of 25 mm in width and 500 mm in length from each of boards A, B, C and D having the structures shown in FIG. 3, and have investigated the relationships between a frequency and a loss factor ($\eta$) for the respective test pieces (See FIG. 4).

The materials and structures of the boards A, B, C and D are as follows:

(i) Board A (one preferred embodiment of this invention)

This board is a composite board in which an acrylic tacky adhesive layer (80 g/m$^2$) is sandwiched between two gypsum plaster boards of 9 mm in thickness, and its entire thickness is 18.2 mm.

(ii) Board B (another preferred embodiment of this invention)

This board is also a composite board in which an acrylic tacky adhesive layer (80 g/m$^2$) associated with a base material made of Japanese paper is sandwiched between two gypsum plaster boards of 9 mm in thickness, and its entire thickness is 78.2 mm.

(iii) Board C (one example of contrasts)

This board is a composite board in which an emulsion type vinyl chloride adhesive layer is sandwiched between two gypsum plaster boards of 9 mm in thickness, and its entire thickness is 18.2 mm.

(iv) Board D (another example of contrasts)

This board is a simple gypsum plaster board of 12 mm in thickness.

Generally, it is acknowledged that if a loss factor ($\eta$) in the proximity of the frequency of 500 Hz is 0.05 or more, the board has a vibration-suppressing effect, and taking this reference value as a measure of availability, since the boards C and D enumerated above as contrasts have a loss factor of about 0.01 at the frequency of 500 Hz, in the case of exerting a mechanical or sonic vibrating force upon these boards, the amplitude of vibration would be increased and resonance is liable to occur, so that a vibration-suppressing effect can be hardly expected from these boards.

Whereas, the board A according to one preferred embodiment of the present invention has a loss factor ($\eta$) of about 0.1 at the frequency of 500 Hz, hence in the case whereas a mechanical or sonic vibrating force is exerted upon the board, resonance would hardly occur, and thus a sufficient vibration-suppressing effect can be expected therefrom. In addition, the board B in which a tacky adhesive layer associated with a base material (Japanese paper sheet) is employed, has a loss factor ($\eta$) of 0.23 at the frequency of 500 Hz, and therefore, a remarkably excellent vibration-suppressing sound-shielding effect can be expected therefrom as compared to the board A in which only a tacky adhesive layer is employed.

Figure 5:
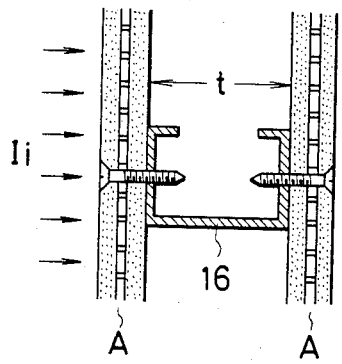
FIG. 5 is a cross-sectional view showing a structure in which test pieces according to one preferred embodiment of the present invention, each of which is one of the above-described test pieces, are secured onto the both surfaces of a base material by means of screws.
Figure 6:
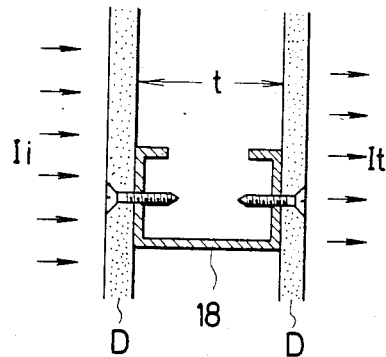
FIG. 6 is a cross-sectional view showing a structure in which test pieces each of which is made of a gypsum plaster single board that is one of the above-described test pieces, are secured onto the both surfaces of a base material by means of screws.

Also, as shown in FIGS. 5 and 6, two boards A and two boards D were fixedly secured onto the both sides of base members (C-shaped channel bars) 16 and 18, respectively, having a width t of 65 mm by means of screws to form test wall bodies, the relationships between a frequency and a sound transmission loss ($=10 \log_{10}(I_i/I_t)$[dB]; where $I_i$ represents an intensity of an incident sound, and $I_t$ represents an intensity of a transmitted sound) were investigated with respect to the respective test wall bodies, and the results of investigation are depicted in FIG. 7.

With reference to FIG. 7, it can be seen that in the case of the board D, when the frequency of the incident sound wave has been increased to 3~4 KHz, a sound transmission loss [dB] is remarkably lowered. This is due to the fact that in the proximity of the frequency of 3~4 KHz, resonance would occur in the board D. Similar phenomena would also occur in the case of employing a simple board such as an asbestos cement board, a calcium silicate board, a metal plate, etc., at the frequencies in the proximity of the characteristic frequencies of these simple boards.

On the other hand, it can be seen from FIG. 7 that in the case of the board A, remarkable lowering of the sound transmission loss [dB] would not occur, but it has a large sound transmission loss [dB] over the entire frequency range as compared to the board D, and thus it can achieve an excellent sound-shielding effect.

In practice, in the case of forming a sound-shielding wall which partitions between rooms in a building by making use of the composite vibration-suppressing sound-shielding board according to the present invention, though no problem would occur if the composite board has such a large area that there is no need to successively connect a plurality of composite boards side by side, generally it is necessary to connect a plurality of unit composite boards side by side both in the horizontal direction and in the vertical direction, and in this case edge portions of adjacent composite boards must be connected in a butting relationship. Such butt-connected portions would deteriorate the sound shielding effect of the composite boards. Therefore, in order to resolve such a problem, upon practically embodying the present invention, it is preferable to join two board materials by the intermediary of a tacky adhesive agent in the manner illustrated in FIG. 8 or 9.

The mode of joining two board materials shown in FIG. 8 is suitable for the case where a plurality of composite boards are to be connected successively side by side only in the horizontal direction, and the mode of joining two board materials shown in FIG. 9 is suitable for the case where a plurality of composite boards are to be connected successively side by side both in the horizontal direction and in the vertical direction. More particularly, in the mode of joining two board materials 12 shown in FIG. 8, one board material 12 having a tacky adhesive layer 14 adhered on one surface is joind with the other board material 12 by the intermediary of the tacky adhesive layer 14 as staggered slightly in the horizontal direction so that a slight connecting margin between adjacent composite boards may be retained along the vertical edge of the composite board. On the other hand, in the mode of joining two board materials shown in FIG. 9, one board material 12 having a tacky adhesive layer 14 adhered on one surface is joined with the other board material 12 by the intermediary of the tacky adhesive layer 14 as staggered slightly both in the horizontal direction and in the vertical direction so that slight connecting margins between adjacent composite boards may be retained along the vertical and horizontal edges of the composite boards.

If the composite boards in which two board materials are joined with each other by the intermediary of a tacky adhesive layer in the manner shown in FIG. 8 or 9 are used, they can be easily butt-connected in the horizontal direction or both in the horizontal and vertical directions, and a sound-shielding performance would not be significantly deteriorated at the connecting portions. Therefore, in practice, a workability in the formation of a sound-shielding wall as well as a sound-shielding performance of the formed sound-shielding wall can be improved.

As will be obvious from the above description, the present invention provides an improved vibration-suppressing sound-shielding board. This vibration-suppressing sound-shielding is a composite board in which a plurality of board materials are joined with each other by means of a tacky adhesive layer. Since vibration energy is effectively absorbed by the tacky adhesive layer, this composite board can reveal an excellent vibration-suppressing sound-shielding performance, and so it is very useful to form a sound-shielding wall. Moreover, a further improved composite board according to the present invention in which a tacky adhesive layer associated with a base material or materials is employed, can achieve a more excellent vibration-suppressing sound-shielding performance than the first-mentioned composite board in which board materials are joined with each other by the intermediary of only a tacky adhesive layer.

Since many changes and modifications can be made to the above-described construction, it is intended that all matter contained in the above description and illustrated in the accompanying drawings shall be interpreted to be illustrative and not in a limiting sense.

What is claimed is:

1. A vibration-suppressing sound-shielding board comprising a plurality of the same kind or of different kinds of boards selected from the group consisting of gypsum plaster boards, asbestos cement boards, calcium silicate boards, plywood boards and glued wood chip boards and a layer or layers of a tacky adhesive intervening between said board materials, said tacky adhesive consisting essentially of one or more kinds of polymers selected from the group consisting of natural rubber, synthetic rubber and various resins, the properties of said tacky adhesive being represented by a pealing tack force of about 200–5000 gf/20 mm and a tensile tack force of about 1–15 kgf/cm$^2$.

2. A vibration-suppressing sound-shielding board as claimed in claim 1, in which said resins are acrylic resins.

3. A vibration-suppressing sound-shielding board comprising a plurality of board materials and at least one tacky adhesive layer associated with a sheet-like base material and intervening between said board materials.

4. A vibration-suppressing sound-shielding board as claimed in claim 3, in which said sheet-like base material is a paper sheet or a cloth.

5. A vibration-suppressing sound-shielding board as claimed in claim 3, in which said sheet-like base material is formed of a material selected from the group consisting of synthetic rubber, natural rubber, plastics, metals and their composite materials.

6. A composite vibration-suppressing, sound-shielding construction board comprising:
   (a) two or more layers of construction board having essentially equivalent densities selected from the group consisting of gypsum plaster board, asbestos cement board, calcium silicate board, plywood-board and glued wood chip board; and
   (b) one or more intervening adhesive layers of a tacky adhesive, said tacky adhesive containing at least an elastic polymer and a tackifier resin and having a pealing tack force of about 200–5000 gf/20 mm and a tensile tack force of about 1–15 kg f/cm$^2$.

7. The composite vibration-suppressing sound-shielding construction board according to claim 6, in which the adhesive layers are associated with a sheet material selected from the group consisting of paper sheet, cloth and a sheet formed from a synthetic rubber, natural rubber, plastics and a composite material thereof, by at least one of impregnating and coating the sheet material with the adhesive, and the adhesive layer associated with the sheet material is sandwiched between the layers of construction board.

* * * * *